US007672850B2

(12) United States Patent
Kaatrasalo

(10) Patent No.: US 7,672,850 B2
(45) Date of Patent: Mar. 2, 2010

(54) METHOD FOR ARRANGING VOICE FEEDBACK TO A DIGITAL WIRELESS TERMINAL DEVICE AND CORRESPONDING TERMINAL DEVICE, SERVER AND SOFTWARE TO IMPLEMENT THE METHOD

(75) Inventor: Antti Kaatrasalo, Jyväskylä (FI)

(73) Assignee: Nokia Corporation, Espoo (FI)

(*) Notice: Subject to any disclaimer, the term of this patent is extended or adjusted under 35 U.S.C. 154(b) by 1052 days.

(21) Appl. No.: 10/448,782

(22) Filed: May 29, 2003

(65) Prior Publication Data

US 2003/0233240 A1 Dec. 18, 2003

(30) Foreign Application Priority Data

Jun. 14, 2002 (FI) .................................. 20025032

(51) Int. Cl.
*G10L 11/00* (2006.01)
*H04M 3/00* (2006.01)
*H04M 1/64* (2006.01)
*H04M 11/00* (2006.01)

(52) U.S. Cl. ................. 704/270.1; 704/270; 379/88.12; 379/88.16; 379/88.05; 379/88.06; 379/88.28; 455/419

(58) Field of Classification Search ....................... None
See application file for complete search history.

(56) References Cited

U.S. PATENT DOCUMENTS 5,095,503 A * 3/1992 Kowalski .................... 455/563
6,216,104 B1 * 4/2001 Moshfeghi et al. .......... 704/260
6,606,596 B1 * 8/2003 Zirngibl et al. ............. 704/270
6,615,175 B1 * 9/2003 Gazdzinski ................. 704/275
6,775,358 B1 * 8/2004 Breitenbach et al. ..... 379/88.13
6,829,334 B1 * 12/2004 Zirngibl et al. .......... 379/88.17

(Continued)

FOREIGN PATENT DOCUMENTS

EP 0584666 B1 11/2000

(Continued)

OTHER PUBLICATIONS

Besacier et al, "GSM Speech Coding and Speaker Recognition", IEEE International Conference on Acoustics, Speech and Signal Processing, ICASSP'00, vol. 2. Jun. 5, 2000-Jun. 9, 2000. pp. 1085-1088.*

(Continued)

*Primary Examiner*—Talivaldis Ivars Smits
*Assistant Examiner*—Matthew H Baker
(74) *Attorney, Agent, or Firm*—Harrington & Smith

(57) ABSTRACT

In one exemplary embodiment of the invention, a method is provided for arranging voice feedback to a digital wireless terminal device, which includes a voice-assisted user interface (Voice UI), wherein the terminal device gives a voice feedback corresponding to its state. The terminal device includes memory devices (PPM) for storing the voice feedbacks. In the method, the following stages take place to arrange the voice feedback in connection with the terminal device: one or more voice feedbacks are generated, the generated voice feedbacks are converted into a digital form, the digitalized voice feedbacks are edited with chosen algorithms (ACELP) in order to reduce their file size, and the edited voice feedbacks are stored in a memory (PPM) arranged in connection with the terminal device.

20 Claims, 6 Drawing Sheets

U.S. PATENT DOCUMENTS

| | | | | |
|---|---|---|---|---|
| 6,850,603 | B1 * | 2/2005 | Eberle et al. | 379/88.16 |
| 7,020,611 | B2 * | 3/2006 | Gilde et al. | 704/270.1 |
| 7,295,608 | B2 * | 11/2007 | Reynolds et al. | 375/240.01 |
| 7,606,936 | B2 * | 10/2009 | Mousseau et al. | 709/239 |
| 2002/0010590 | A1 * | 1/2002 | Lee | 704/277 |
| 2002/0055837 | A1 * | 5/2002 | Ahonen | 704/228 |
| 2002/0059073 | A1 | 5/2002 | Zondervan et al. | 704/270.1 |
| 2002/0069071 | A1 | 6/2002 | Knockeart et al. | 704/275 |
| 2002/0072918 | A1 | 6/2002 | White et al. | 704/270.1 |
| 2003/0033331 | A1 * | 2/2003 | Sena et al. | 707/513 |
| 2007/0150287 | A1 * | 6/2007 | Portele et al. | 704/275 |

FOREIGN PATENT DOCUMENTS

| | | | |
|---|---|---|---|
| FR | 2822994 | A1 | 3/2001 |
| WO | WO-96/19069 | A1 | 6/1996 |
| WO | WO 01/28187 | A1 | 4/2001 |

OTHER PUBLICATIONS http://www.sac.sk/files.php?d=11&I=W.*

* cited by examiner

METHOD FOR ARRANGING VOICE FEEDBACK TO A DIGITAL WIRELESS TERMINAL DEVICE AND CORRESPONDING TERMINAL DEVICE, SERVER AND SOFTWARE TO IMPLEMENT THE METHOD

CROSS-REFERENCE TO RELATED APPLICATIONS

This patent application claims priority under 35 U.S.C. §119(a) from Finnish Patent Application No. 20025032, filed Jun. 14, 2002.

FIELD OF THE INVENTION

The invention concerns a method for arranging voice feedback to a digital wireless terminal device, which includes a voice-assisted user interface (Voice UI), wherein the terminal device gives voice feedback corresponding to its state and wherein the terminal device includes memory devices, in which the said voice feedbacks are stored. The invention also concerns a corresponding terminal device, server and software devices to implement the method.

BACKGROUND OF THE INVENTION

A voice-assisted user interface has been introduced in digital wireless terminal devices as a new feature. The voice-assisted user interface allows the user to control his terminal without effort and without eye contact in particular. With a user interface concept of this kind advantage is achieved, for example, in professional users, such as, for example, in authority and vehicle use and among users with limited visual abilities.

A voice-assisted user interface always entails a need to get information without eye contact about the current state of the terminal device and about the arrival of commands directed thereto. As one example such a situation may be mentioned, where the user sets his terminal device to listen to a certain traffic channel. Hereby the rotating tuner is used to select, for example, manually a channel, whereupon the terminal device gives a voice feedback corresponding to the channel selection. If the selection of channel was successful, the selecting actions can be stopped. But on the other hand, if the selection of a channel failed, then the selecting is continued, until the desired traffic channel is found. Such voice feedbacks may be mentioned as another example, which the terminal device gives spontaneously, for example, relating to its state at each time.

For example, storing in state-of-the-art terminal devices of the voice feedbacks used in the situations described above has been very problematic and also generally there are hardly any functioning solutions for its implementation. It has also been regarded as a problem how generally to use voice feedbacks in a voice-assisted user interface and how they could be connected to the control steps taken by the users in the terminal device.

Some implementation models have been proposed for the problem of the described kind. Implementations with the closest application areas are found in connection with the name/voice call functions of some mobile station terminals.

Arranging of voice feedbacks to digital wireless terminal devices with various synthesizer applications is presented as the state of the art. Numerous examples of these have been presented in various publications, of which U.S. Pat. No. 5,095,503 (Kowalski) can be mentioned as an example. However, the main drawback of these implementations is their excessive power consumption, although in fact the objective is to minimize this in mobile terminal devices.

The state of the art is also described in the solution presented in WO Publication 96/19069 (Qualcomm Incorporated), wherein voice feedbacks are arranged to the terminal device, for example, in its post-programmable non-volatile memory. Herein the voice feedbacks are processed in order to reduce their file size before they are stored in the memory. However, such a situation constitutes a problem in this solution, where voice feedbacks ought to be arranged in the terminal device for several different user groups, such as, for example, for different language areas. To this end it has been proposed to equip the terminal device with a special additional memory, which makes the implementation clumsy from the viewpoint both of the user and the manufacturer of the terminal device.

SUMMARY OF THE INVENTION

It is a purpose of this invention to bring about a new kind of method for arranging voice feedbacks to a digital wireless terminal device. With the method according to the invention, voice feedbacks can be stored easily in the terminal's memory devices known as such. The characteristic features of an exemplary embodiment of this invention include a method, a terminal device implementing the method, as well as a server and software to implement the method.

In the method according to the invention, a memory located in the terminal device is used to store and provide voice feedbacks. Non-volatility and post-programmability are typical features of the memory, which may be, for example, of the EEPROM type.

The voice feedbacks brought about in the method according to the invention are digitalized and stored in the chosen file format, which preferably is some well supported such. Then the formed voice feedback files are processed with chosen algorithms, for example, to reduce their file size and to form of them a special user-profile-specific voice feedback file packet. The file packets thus achieved are then compiled into a voice feedback PPM (Post-Programmable Memory) data packet including several user groups. Next, the voice feedback PPM data packet is integrated together with PPM data packets compiled from other user interface settings. According to an advantageous embodiment, from the PPM files thus formed data corresponding with desired user profiles can then be selected, which data is stored in the PPM memory devices of the terminal device.

According to one embodiment, in the method according to the invention the terminal device's final user, user group, network operator, service provider or a corresponding organization may establish their own personal voice feedbacks into the user interface of their terminal devices.

Several significant advantages are achieved with the method according to the invention. With this method the voice feedbacks of the user interface are arranged in a safe memory area of the terminal device, whereby it is not possible for the user of the terminal device to lose his feedbacks. Furthermore, the manner of implementation according to the method eliminates the terminal's need of instruction. As is known, in known voice-assisted terminal devices the user usually has to set manually the correspondences of functions and of their corresponding feedbacks.

Voice feedbacks can be compressed into a very small size, thus reducing the need for memory to be reserved in the terminal device. Speech codecs for use in the target terminal device are preferably used in the compression.

According to one more advantageous embodiment, the actual target device of the voice feedbacks may be used for generating voice feedbacks. In this way a special advantage is achieved in compiling multi-lingual databases, because the voice feedbacks can now be collected flexibly from the final users according to their own needs. This achieves a significant saving in costs, because especially in the case of small language areas it is not sensible to use special professionals in the localization of the voice-assisted user interface.

Furthermore, the method allows variability of the voice feedbacks. The users may store, for example, their own feedbacks with the same software, of which the "best" can then be "generalized" for the language area, organization or such in question. Since the terminal devices are used by their real users in real functional environments, it is thus possible to polish the feedbacks to be purposeful in operative terms.

Examples of wireless terminal devices to which the invention can be applied are solutions based on CDMA (Code Division Multiple Access), TDMA (Time Division Multiple Access) and FDMA (Frequency Division Multiple Access) technologies and their sub-definitions as well as technologies under development. In addition, the invention may also be applied in multimedia terminal devices, of which digital boxes, cable television and satellite receivers etc. can be mentioned as examples.

Other features characterizing the method, terminal device, server and software devices according to the invention emerge from the appended claims, and more possible advantages are listed in the specification.

BRIEF DESCRIPTION OF THE DRAWINGS

The invention is not limited to the embodiments described hereinafter and it is described in greater detail by referring to the appended figures, wherein.

DETAILED DESCRIPTION OF THE INVENTION

Figure 1:
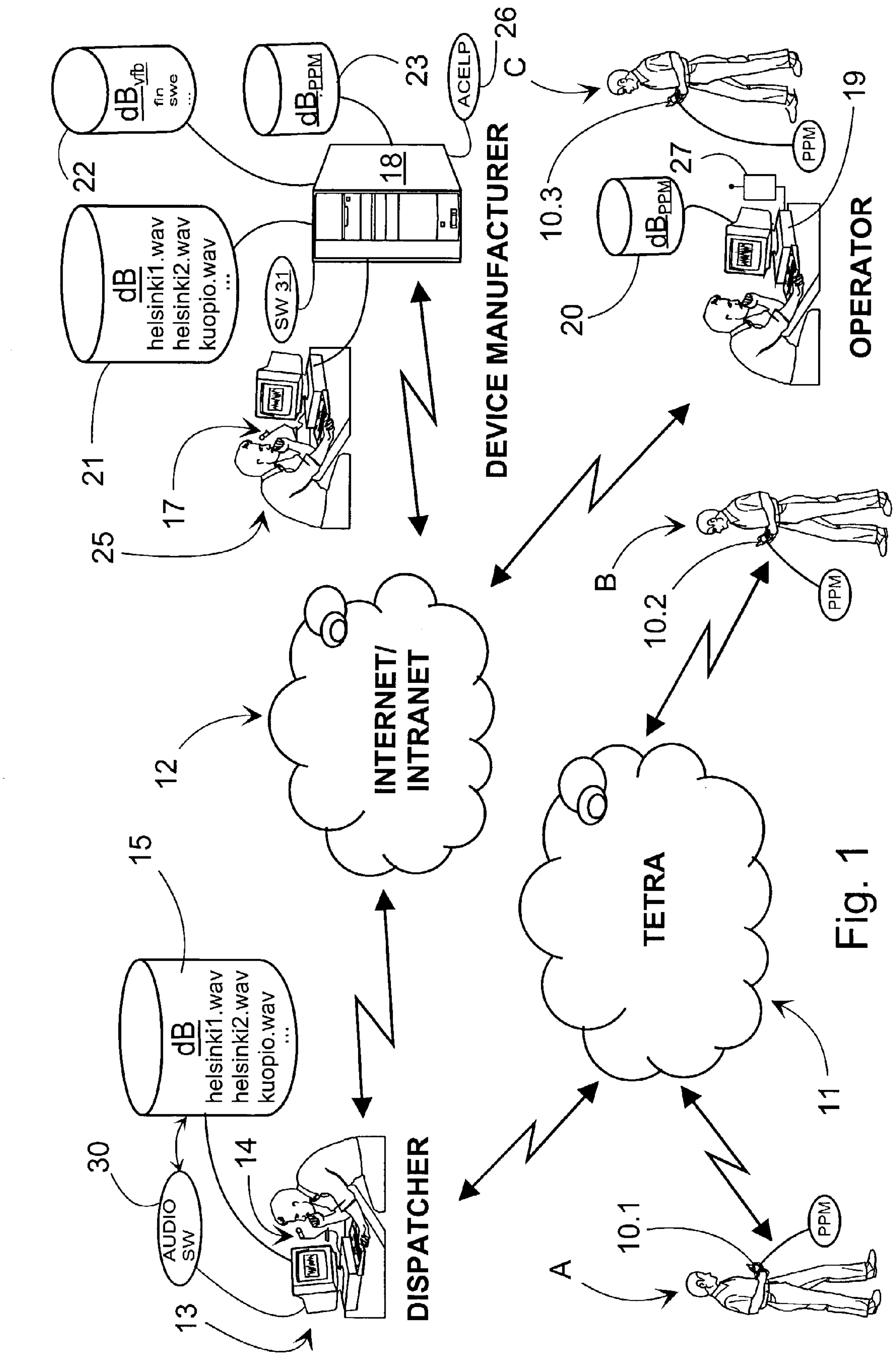
FIG. 1 is a schematic view of an example of parties taking part in the method according to the invention in a mobile station environment.

FIG. 1 is a schematic view of an example of the possible functional environment of the method according to the invention and also of an example of parties operating in the method. Where voice feedbacks are mentioned hereinafter, they mean stored speech feedbacks originating in human beings, which the voice-assisted user interface (Voice UI) of terminal device 10.1-10.3 is set to repeat, thus allowing its control and follow-up of its state without eye contact in several different service situations and events.

The term "voice-assisted" can be understood quite largely. It may be used according to a first embodiment to refer to a user interface, wherein user A, B, C sets his terminal device 10.1-10.3 manually in the operative state of his choice. The terminal device 10.1-10.3 then moves into this state and gives a corresponding voice feedback.

According to another embodiment, in the voice-assisted user interface the user A-C of the terminal device 10.1-10.3 may also do the said setting of the operative state in such a way that he utters a command, which he has set in the terminal device 10.1-10.3. The speech recognition functionality arranged in the terminal device 10.1-10.3 recognises the command, shifts into the corresponding operative state and then gives the voice feedback corresponding to that state.

According to a third embodiment of the invention, the terminal device 10.1-10.3 may also give voice feedbacks spontaneously, which have nothing to do with the actions or commands, which user A-C addresses to it or does not address to it. Examples of these are status information relating to the terminal device 10.1-10.3 or to the data communication network (for example, "message arrived", "low power", "audibility of network disappearing" and other such).

It is surprising in the method according to the invention that for storing voice feedbacks a special memory area is used in the terminal device 10.1-10.3 and, more specifically, a manner of memory arrangement known as such in some types of terminal device. The type of memory for use in terminal devices 10.1-10.3 is usually a non-volatile and post-programmable memory.

In the terminal device 10.1-10.3 the memory may be divided into two areas. Arranged in the first memory area is hereby the terminal device's 10.1-10.3 software, such as its operating system MCU (Master Control Unit), while in the second area the terminal device's 10.1-10.3 user-profile-specific data is arranged. User profile may hereby mean, for example, a language group and data may mean, for example, characters and types belonging to the language, user interface texts expressed in the language, a language-specific alphabetical order, call sounds directed to the language area in question, etc. Such user profiles may be arranged in the terminal device 10.1-10.3, for example four at a time, depending e.g. on where the concerned batch of terminal devices is to be delivered.

The memory area reserved for this data, or more exactly for the so-called PPM file formed of the data, is called PPM memory (Post-Programmable Memory), which the terminal device's 10.1-10.3 software sees as a ROM memory (Read Only Memory). It is a characteristic of the PPM memory area that it is arranged separately from the fixed code and standard area, whereby it is not affected by the terminal device's 10.1-10.3 software versions or by their checksums.

The data packets stored in the PPM memory or the PPM file formed of them must comply with a certain structural design and they must have exact identifiers, so that the software of the terminal device can find and be able to read the data required in each situation.

Figure 2:
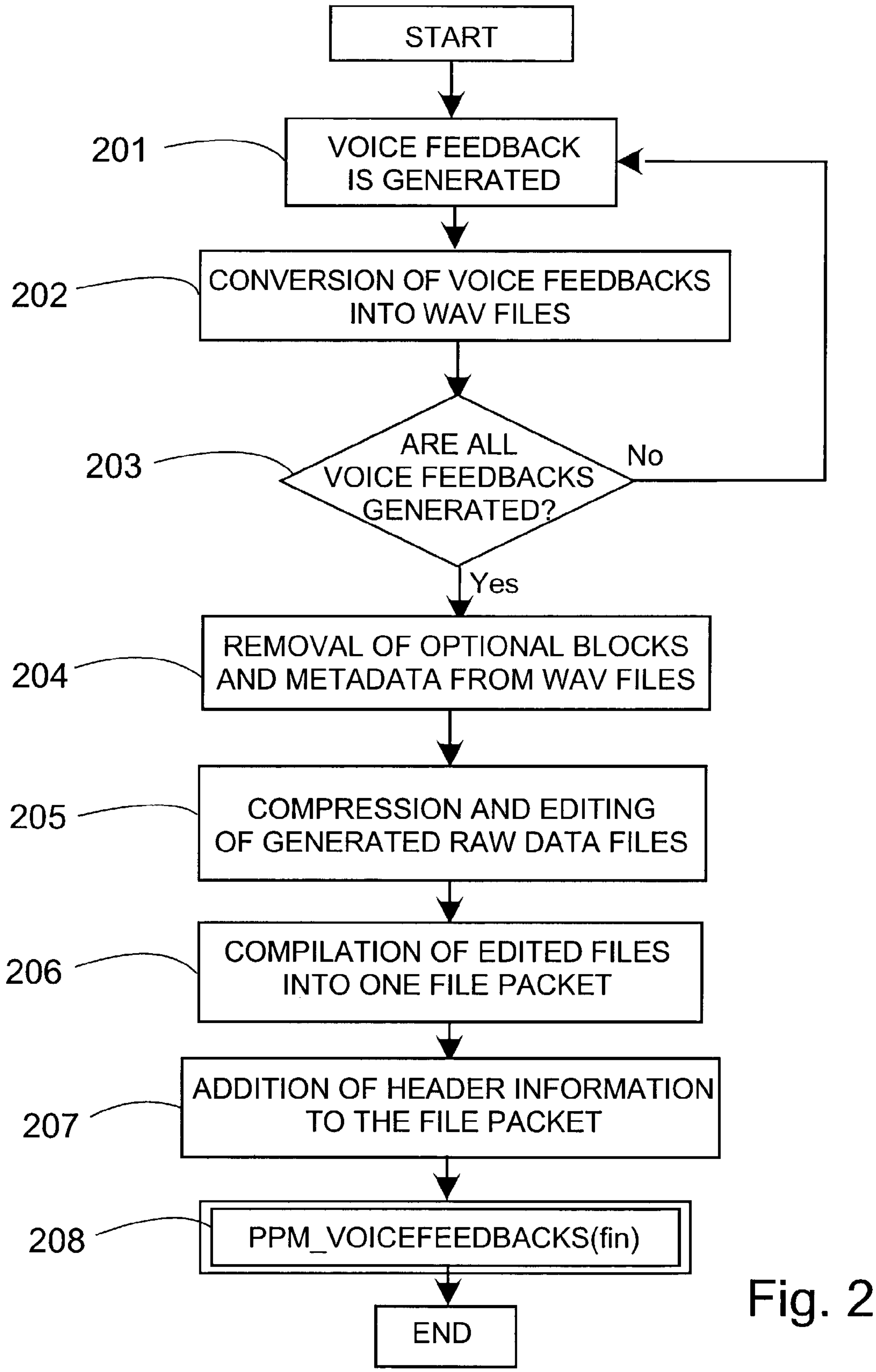
FIG. 2 is a flow diagram showing an example of the method according to the invention in the formation of user-profile-specific voice feedbacks.

FIG. 2 is a flow diagram showing an application example implementing the method according to the invention for forming user-profile-specific voice feedbacks, which example will be described in the following referring to the parties shown in FIG. 1.

In the method according to the invention, the client, such as, for example, a final user A-C, the terminal device's 10.1-10.3 user group formed of these (for example, the rescue, defence or traffic department), a network operator, a service provider, a business organization or other such can generate voice feedbacks for himself. In the application example, which describes application of the method to authority operation performed in a TETRA network system 11 (TErrestrial Trunked RAdio), the voice feedbacks are generated by user group A-C, an operation manager DISPATCHER or such, according to a first embodiment of the invention.

The operation manager DISPATCHER has access to a terminal device of a kind known as such, such as, for example, a personal computer 13 (PC). Arranged in connection with terminal device 13 are microphone devices 14, which are conventional as such and which are used by the operation manager also in a conventional manner to control the operations of units operating in the field, such as police patrols A, B, C. The terminal device 13 further includes audio card devices and software or corresponding functionalities for processing, storing and repeating a signal in audio form (not shown).

The operation manager DISPATCHER uses his terminal device 13 to start the generation of user-profile-specific voice feedbacks (201). In this application example, Finnish is defined as the user profile and the names normally used for the traffic channels used in the terminal device are defined as voice feedbacks. In certain user groups (for example, the police) there may be even thousands of traffic channels or user groups formed of users A-C. The terminal device 10.1-10.3 may include fixed groups, for example, in 24 memory locations, and besides these there may also be dynamic groups. Based on the above it is obvious that arranging the voice feedbacks by traditional methods in the terminal device 10.1-10.3 would considerably consume its limited memory resources.

The operation manager DISPATCHER uses his terminal device 13 to activate the said software, with which the voice feedbacks are stored in the chosen file format. The operation manager DISPATCHER utters feedbacks, for example, one at a time into his microphone 14, from which they are converted further by audio software 30 run by terminal device 13 and are converted and stored in a digital, preferably some well supported audio data format (202). An example of such a format is the standard WAV audio format 15, which is used the most usually in PC environment and all forms of which have a structure in accordance with the RIFF (Resource Information File Format) definition. An example of typical format parameter values for the WAV format to use is the PCM (non-compressed, pulse code modulated data), sampling frequency: 8 kHz, bit resolution: 16 bit, channel: mono.

Each converted WAV file is given a name and is stored in an identifiable manner, such as, for example, 1=helsinki1.wav, 2=helsinki2.wav, 3=kuopio.wav, etc. The corresponding voice feedbacks stored in the said files may be "group helsinki one", "group helsinki two", "group kuopio", etc.

When all voice feedbacks have been generated and digitalized, the individual WAV audio files are delivered, for example, to the terminal device manufacturer 25 or corresponding through the data communication network, such as, for example, internet-/intranet network 12 (203). Another example of a possible manner of delivery is by using some applicable data-storing medium.

Another in a certain way even surprising way of generating voice feedbacks in this stage of the method according to the invention is such that the final users A-C of the target terminal devices 10.1-10.3 of voice feedbacks utter voice feedbacks into their terminal devices 10.1-10.3. The voice feedbacks are sent by the terminal device 10.1-10.3 through TETRA network system 11 as a radio transmission of a known kind to the party attending to the further processing of the voice feedbacks, such as, for example, to the said terminal device manufacturer 25. Hereby the terminal device manufacturer 25 carries out the conversion of analog voice feedbacks into digital form as individual WAV files. In this embodiment, stages (202) and (203) may thus be in a reversed order, if desired.

The terminal device manufacturer 25, or any other party having a corresponding functionality from the viewpoint of the method according to the invention, uses software devices 31 for implementation of the method according to the invention. Software devices 31 include a special WAV conversion functionality, which is used to process the received WAV files or WAV files formed of received analog voice feedbacks according to the method of the invention as one user-profile-specific file packet.

Digitalized WAV audio files 21 are given as input to the WAV conversion functionality belonging to software devices 31. These are edited first with a raw data encoder in such a way that such peripheral information is removed from them, which is usually arranged in connection with the WAV file format and which is on-essential for the audio data proper. Hereby only raw audio data thus remains in the files (helsinki1.raw, helsinki2.raw, kuopio.raw . . . ). In the "cleaning" of WAV files, such optional locks and meta data are removed, which is usually arranged in connection with them and which contains header and suffix information (204), among other things. Examples of such information are performer, copyright, style and other information.

The raw data files (helsinki1.raw, helsinki2.raw, kuopio-.raw . . . ) resulting from this action is processed by software devices 31 in the following stage (205) of the method with some efficient information compression algorithm.

According to an advantageous but not limiting embodiment, such an algorithm may be chosen, for example, from coders based on the CELP (Codebook Excited Linear Predictive) method. One coder belonging to this class is ACELP (Algebraic Code Excited Linear Predictive) coding, which is used, for example, in the TETRA radio network system 11. Reference is made to the TETRA speech codec in the ETS 300 395 standard. The ACELP coder 26 in question is arranged in the speech encoding and decoding modules of terminal devices 10.1-10.3 and at the terminal device manufacturer 25.

With ACELP coder 26 a very small file size is achieved with no harmful effect on the quality of sound. The ACELP coder's 26 bit transfer rate is 4,567 kb/s.

Other possible but not limiting examples of usable coding are VSELP (Vector-Sum Excited Linear Prediction), coders based on LPC computation, GSM coders, manufacturer-specific coders as well as the recommendations of ITU (International Telecommunication Union) for coding arrangement. It can be mentioned as a general principle that a codec may be used in the target terminal device 10.1-10.3.

Thus, the purpose of stage (205) is to reduce the size of files and at the same to edit the data they contain into a form, which the speech codec will understand. When required, the data is divided into blocks of a suitable length, so that the speech codec at the terminal device 10.1-10.3 can be utilised directly.

In the following stage, the formed and compressed raw data files are compiled in the software devices 31 into one user-profile-specific file packet (206).

Stage (206) is followed by a stage where the final ACELP-coded file packet is made and where the software devices 31 are used to add header information (207) into the file packet. A numbering of voice feedbacks congruent with the numbering defined in the Voice UI specification must be used in the voice feedback PPM file formed of the TETRA-coded user-profile-specific voice feedback packet (PPM_VOICEFEEDBACKS(fin)) and of the corresponding file packets in a later stage. The information may include, for example, index information, with which the terminal device's 10.1-10.3 user interface may fetch user-profile-specific data arranged in its PPM memory devices.

Thus, the TETRA coded PPM_VOICEFEEDBACKS(fin) (208) file packet generated in stages (201-207) now contains the fin voice feedbacks of an individual user profile group. One example of such a user profile division could be, as already mentioned earlier, a division made according to language areas. Another example could be an organization-specific manner of division, where the police have feedbacks of their own, the traffic department have their own, the fire department have their own, etc., or even an entirely final-user-specific manner of division, where each user A, B, C has his/her own voice feedback.

Figure 3:
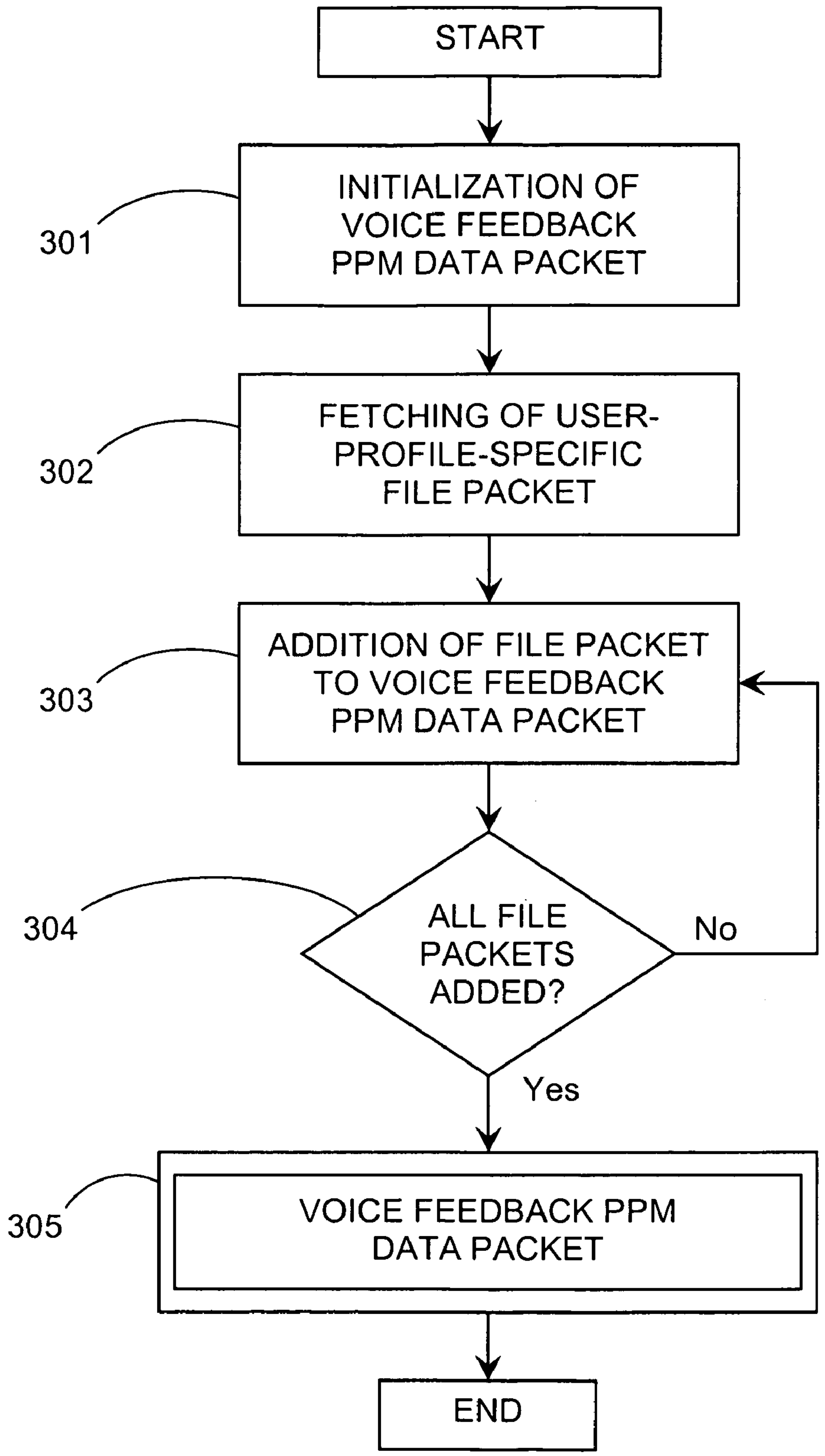
FIG. 3 is a flow diagram showing an example of the method according to the invention for compiling user-profile-specific voice feedbacks into one PPM data packet.

FIG. 3 is a flow diagram showing an example of how one or more user-profile-specific voice feedback file packets $dB_{vfb}$ (fin, swe, . . . ) 22 are compiled into one voice feedback PPM data packet (305) 23. After generating for each desired user profile, such as, for example, each language area, its own TETRA-coded user-profile-specific voice feedback file packet using the software devices 31, one integrated voice feedback PPM data packet is compiled of these, which contains the voice feedbacks stored in advance of all different languages.

As the first stage a voice feedback PPM data packet (301) is initialized. User-profile-specific file packets are added to the initialized voice feedback PPM data packet. The compilation of file packets is done in a manner known as such to the professional in the art, and from the viewpoint of the invention this manner need not be described here in greater detail (302-304). As the final result of the procedure a multi-language voice feedback PPM data packet (305) is achieved, which contains all TETRA coded file packets.

Figure 4:
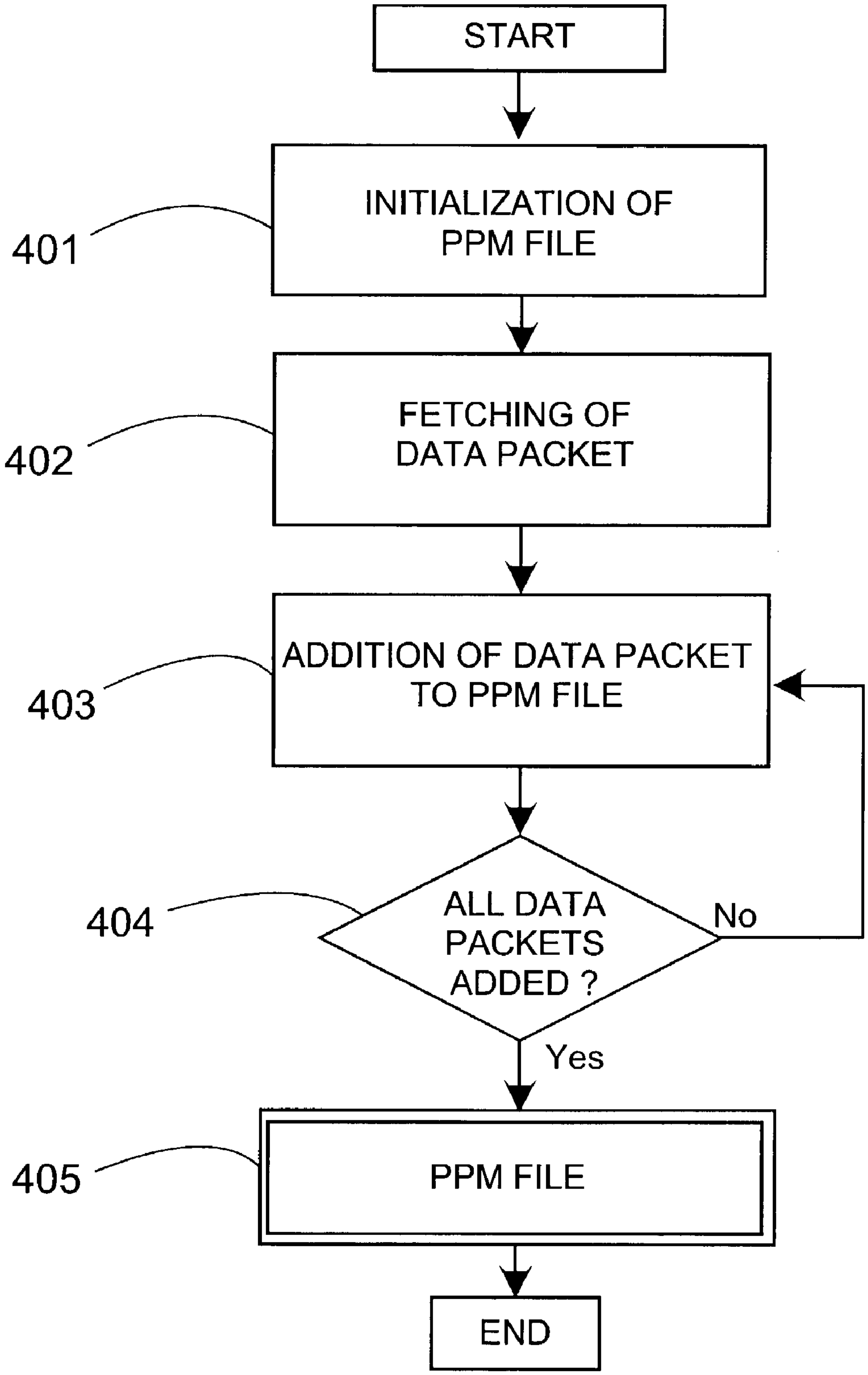
FIG. 4 is a flow diagram showing an example of the method according to the invention in the formation of a PPM file.

FIG. 4 is a flow diagram showing an example of the method according to the invention for forming a complete PPM file. Upon compilation of the voice feedback PPM data packet containing all the desired user profiles, it is taken as one sub-component into the process for generating a complete PPM file. The PPM file is initialized by adding to it information (401) necessary for the PPM hierarchy. The voice feedback PPM data packet is combined with the other data packets of the user interface into one complete PPM file (402-404) and the outcome of this stage is a complete PPM file (405).

The formed complete PPM file contains all the possible PPM-data. Such data is, for example, the said sets of characters, types, texts, calling sounds and alphabetical order information of the different languages.

Figure 5:
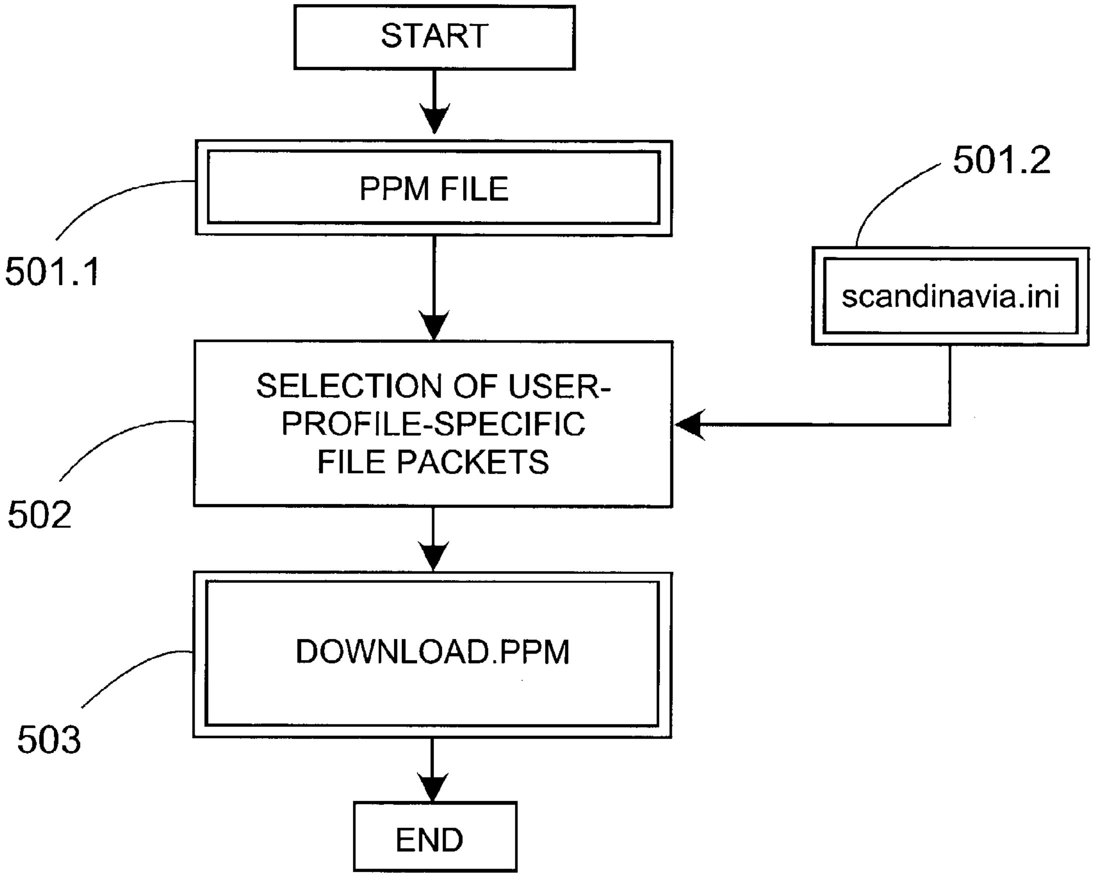
FIG. 5 is a flow diagram showing an example of the method according to the invention for compiling user-profile-specific data into a PPM file for downloading into the terminal device.

FIG. 5 is a flow diagram showing an example of the method according to the invention for compiling user-profile-specific data packets into a PPM file for downloading in the terminal device. Upon compilation of the complete PPM file, it is not normally downloaded in its entirety into the terminal device 10.1-10.3, but a special downloadable PPM packet (download.ppm) is compiled of it using a special software, where, for example, the terminal device manufacturer, the network OPERATOR or the final user A, B, C may select the sub-components of the PPM file he desires for downloading in his terminal device 10.1-10.3. In the application example shown in FIG. 1, the choice is made by the network OPERATOR, who in his terminal device 19 has the functionalities for implementing the procedure according to the flow diagram shown in FIG. 5 as well as the devices 20, 27 for storing a complete PPM file $dB_{PPM}$ and for receiving it from the device manufacturer 25.

From the said complete PPM file packet parts are chosen based on a chosen criterion for storing in the memory devices of the said terminal device 10.1-10.3 (501.1). For conventional PPM packets data packets are chosen from a few (for example, four) user profiles (now from the language group, to the market area of which the said terminal device 10.1-10.3 is on its way). In the choice, the selecting software is given scandinavia.ini (501.2) parameters in the introduction file, and the selection of the user profiles is made according to these parameters.

Figure 6:
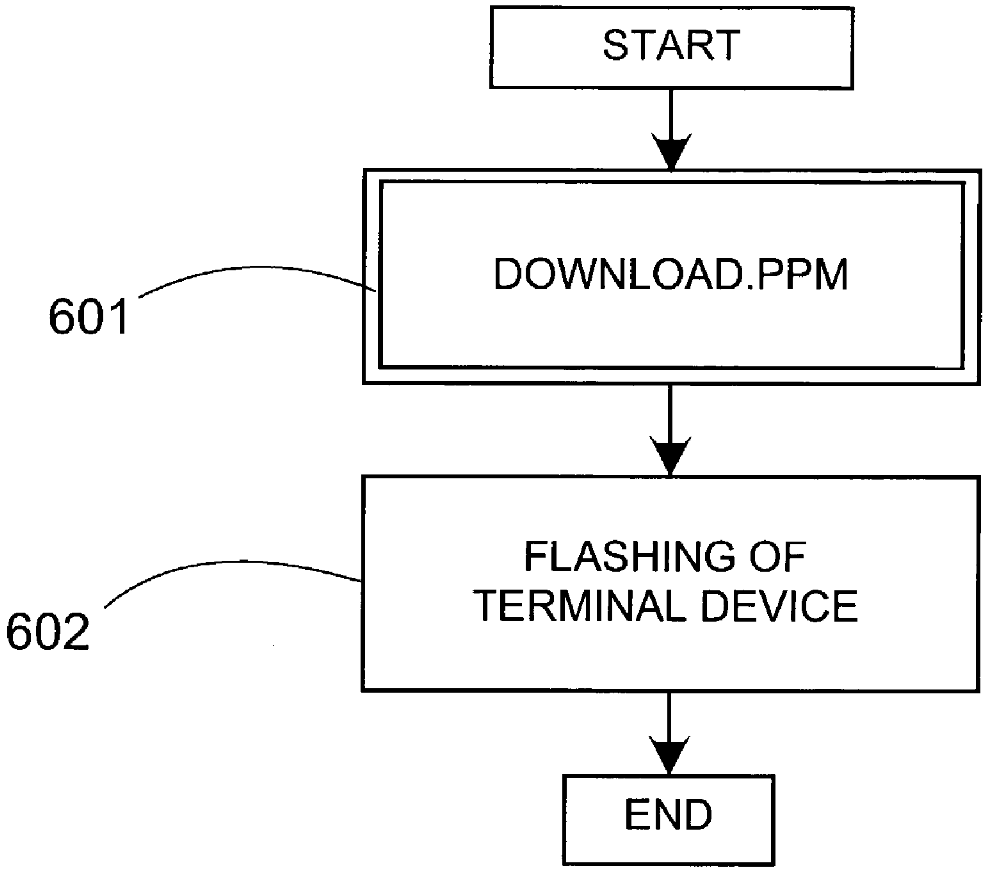
FIG. 6 is a flow diagram showing an example of the method according to the invention for storing the compiled PPM file into the terminal device.

FIG. 6 is a flow diagram showing an example of the method according to the invention for storing the compiled PPM file in the terminal device 10.3. When the PPM packet DOWNLOAD.PPM to be downloaded in terminal device 10.3 has been compiled (601), it is stored in the terminal device's 10.3 PPM memory in a manner known as such, for example, whereby the supplier of the terminal device 25, the network OPERATOR or the device distributor performs the storing (602).

The terminal devices 10.1-10.3 are distributed to the user groups, where the users A-C then choose the voice feedbacks of, for example, their own language area or user group for use. When the user A-C changes the language to be used on the menu, the voice feedbacks will also be changed correspondingly. Selection options varying from these are also possible.

When the user A-C sets his terminal device 10.1-10.3 on to traffic channel HELSINKI__1, the terminal device 10.1-10.3 moves over to this channel and gives the corresponding voice feedback "group helsinki one". The voice feedback may also be an index value identifying the said voice feedback, which index value would in this case be "one", because the traffic channel's helsinki__1 voice feedback has the index 1 in the PPM memory.

The method according to the invention allows an advantageous arrangement of voice feedbacks for different dialect areas and for small languages normally lacking support. Terminal devices intended for blind people and for those with failing eyesight may be mentioned as one more example of an application area for the invention.

The terminal device mentioned in the specification can be understood very largely. Although the above is a description of arranging voice feedbacks in mobile terminal devices 10.1-10.3, this is of course also possible in the application example in the DISPATCHER's terminal device 13, in the OPERATOR's terminal device 19 and in the multimedia terminal devices already mentioned earlier (not shown).

The method according to the invention has been described in the foregoing in the light of a single application example. It should be noticed that especially the forming and processing of data packets to be arranged in the PPM memory as shown in FIGS. 3-6 is a technology fully known as such to the professional in the field, so there is no need to explain it more deeply in regard to the aforesaid. It is also self-evident that the procedural stages of action for implementation of the method according to the invention may include sub-stages besides those presented above, and in some cases these may also be carried out in orders different from the above (for example, depending on the manufacturer). What is essential in the method according to the invention is that the voice feedbacks are arranged in the terminal device's post-programmable PPM memory as one voice feedback PPM data packet used by the user interface. In this manner support can be arranged very advantageously in the terminal device 10.1-10.3 for the voice feedbacks of several different user or language groups.

It should be understood that the above specification and the figures relating to it are only intended to illustrate the method according to the invention as well as the terminal device, server and software devices for implementation of the method. Thus the invention is not limited only to the embodiments presented above or to those defined in the claims, but many such different variations and modifications of the invention will be obvious to the man skilled in the art, which are possible within the scope of the inventive idea defined in the appended claims.

What is claimed is:

1. A method comprising:

receiving one or more voice feedbacks that correspond to one or more states of a terminal device, converting the received voice feedbacks into a digital form, editing the digitalized voice feedbacks with at least one chosen algorithm in order to reduce their file size, forming at least two user-profile-specific file packets of the digitalized voice feedbacks edited with the at least one chosen algorithm, where the at least two user-profile-specific file packets correspond to at least two different user groups, each user group being comprised of a plurality of terminal devices for a plurality of users, compiling a voice feedback data packet comprised of said at least two user-profile-specific file packets, integrating the compiled voice feedback data packet with data packets of other user interface settings into one file, and sending at least a portion of the one file to the terminal device.

2. The method according to claim 1, wherein the voice feedbacks are generated at the terminal device.

3. The method according to claim 2, wherein the voice feedbacks are received through a data communication network.

4. The method according to claim 3, where the data communication network comprises a terrestrial trunked radio (TETRA) network system and where the one file is sent to the terminal device through the TETRA network system.

5. The method according to claim 2, where the plurality of languages includes a first language and a second language, where the plurality of voice feedbacks includes first voice feedbacks for the first language and second voice feedbacks for the second language, where the one or more user-profile-specific file packets comprise a first user-profile-specific file packet for digitalized voice feedbacks for the first language and a second user-profile-specific file packet for digitalized voice feedbacks for the second language, the method further comprising selecting at least one of the first language and the second language, where the voice feedback data packet comprises at least one of the first user-profile-specific file packet and the second user-profile-specific file packet based on the selection.

6. The method according to claim 1, wherein the digitalized voice feedbacks are in a WAV format.

7. The method according to claim 1, wherein the at least one chosen algorithm for reducing the file size of digitalized voice feedbacks is selected such that a speech codec at the terminal device can be directly utilized.

8. The method according to claim 1, wherein forming said at least two user-profile-specific file packets of the digitalized voice feedbacks edited with the at least one chosen algorithm comprises:

removing header and suffix information from said digitalized voice feedbacks to obtain raw data files, compressing said raw data files and editing them with a coder to obtain compressed raw data files, compiling the compressed raw data files together into one compiled file packet, and adding header information to the one compiled file packet.

9. The method according to claim 1, wherein the at least one chosen algorithm comprises algebraic code excited linear predictive coding.

10. The method according to claim 1, wherein the at least a portion of the one file is sent to the terminal device for storage in post programmable memory.

11. The method according to claim 1, wherein sending the at least a portion of the one file to the terminal device further comprises selecting the at least a portion of the one file based on at least one criterion.

12. The method according to claim 1, where the one or more voice feedbacks comprise a plurality of voice feedbacks for a plurality of languages.

13. A terminal device including a voice-assisted user interface (Voice UI), wherein the terminal device is adapted to give voice feedbacks corresponding to its state and wherein the terminal device includes at least one memory device storing at least a portion of one voice feedback file, where the at least one voice feedback file comprises voice feedbacks arranged as at least two user-profile-specific file packets integrated with data packets of user interface settings, where the at least two user-profile-specific file packets correspond to at least two different user groups, each user group being comprised of a plurality of terminal devices for a plurality of users.

14. The device according to claim 13, where the at least one memory device comprises post programmable memory.

15. A device comprising instructions embodied on a memory of the device, execution of the instructions resulting in operations comprising:

receiving one or more voice feedbacks that correspond to one or more states of a terminal device, converting the received voice feedbacks into a digital form, editing the digitalized voice feedbacks with at least one chosen algorithms in order to reduce their file size, forming at least two user-profile-specific file packets of the digitalized voice feedbacks edited with the at least one chosen algorithm, where the at least two user-profile-specific file packets correspond to at least two different user groups, each user group being comprised of a plurality of terminal devices for a plurality of users, compiling a voice feedback data packet comprised of said at least two user-profile-specific file packets, integrating the compiled voice feedback data packet with data packets of other user interface settings into one file, and sending at least a portion of the one file to the terminal device.

16. The device according to claim 15, wherein the operation of sending the at least a portion of the one file further comprises selecting the at least a portion of the one file based on at least one criterion.

17. An apparatus comprising:

means for receiving one or more voice feedbacks that correspond to one or more states of a terminal device, means for converting the received voice feedbacks into a digital form, means for removing header and suffix information from the digitalized voice feedbacks to obtain raw audio data files, coder means for compressing and editing the raw audio data files to obtain compressed raw audio data files, means for forming at least two user-profile-specific file packets of the compressed raw audio data files, where the at least two user-profile-specific file packets correspond to at least two different user groups, each user group being comprised of a plurality of terminal devices for a plurality of users, means for compiling a voice feedback data packet comprised of said at least two user-profile-specific file packets, means for integrating the compiled voice feedback data packet with data packets of other user interface settings into one file, and means for sending at least a portion of the one file to the terminal device.

18. The apparatus according to claim 17, wherein the coder means uses algebraic code excited linear predictive coding.

19. The apparatus according to claim 17, wherein the means for sending the at least a portion of the one file to the terminal device further comprises means for selecting the at least a portion of the one file based on at least one criterion.

20. A computer-readable memory, said computer-readable memory storing software, execution of the software by a device resulting in operations comprising the steps of the method of claim 1.

* * * * *